United States Patent
Breeding et al.

(10) Patent No.: US 7,638,771 B2
(45) Date of Patent: Dec. 29, 2009

(54) ON-LINE TIME-OF-FLIGHT MASHING: DMA REBINNING APPLIED TO A LONG-AXIS PET-TOF SYSTEM FOR REDUCED TRANSAXIAL ANGULAR SAMPLING WITH 3-D NEAREST-NEIGHBOR PROJECTION-SPACE REBINNING IN CLINICAL PET/CT

(75) Inventors: John E. Breeding, Knoxville, TN (US);
Michael E. Casey, Louisville, TN (US);
William F Jones, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 343 days.

(21) Appl. No.: 11/749,434

(22) Filed: May 16, 2007

(65) Prior Publication Data

US 2007/0269093 A1 Nov. 22, 2007

Related U.S. Application Data

(60) Provisional application No. 60/801,529, filed on May 18, 2006, provisional application No. 60/863,590, filed on Oct. 31, 2006.

(51) Int. Cl.
*G01T 1/166* (2006.01)

(52) U.S. Cl. ................................. 250/363.04
(58) Field of Classification Search ............. 250/363.04
See application file for complete search history.

(56) References Cited

U.S. PATENT DOCUMENTS

2005/0253074 A1* 11/2005 Jones et al. ............ 250/363.04
2005/0253075 A1* 11/2005 Jones et al. ............ 250/363.04

OTHER PUBLICATIONS

Jones et al, "Nearest-Neighbor Rebinning in Clinical PET: Fast and Accurate on-Line 3-D LOR-to-Bin Mapping on the HRRT with the New PDR Card," Nuclear Science Symposium Conference Record, Oct. 2004, vol. 5, pp. 3142-3145.*

* cited by examiner

*Primary Examiner*—David P Porta
*Assistant Examiner*—Mark R Gaworecki

(57) ABSTRACT

A system for generating time-of-flight (TOF) positron emission tomography (PET) projection data includes a direct memory access rebinner constructed as a digital FPGA pipeline for rebinning TOF coincidence data in accordance with a number of projection space mapping algorithms, such as single-slice rebinning (SSRB) and reduced multiple-slice rebinning (MSRB), together with less precise transaxial and/or axial sampling.

26 Claims, 5 Drawing Sheets

US 7,638,771 B2

ON-LINE TIME-OF-FLIGHT MASHING: DMA REBINNING APPLIED TO A LONG-AXIS PET-TOF SYSTEM FOR REDUCED TRANSAXIAL ANGULAR SAMPLING WITH 3-D NEAREST-NEIGHBOR PROJECTION-SPACE REBINNING IN CLINICAL PET/CT

CROSS-REFERENCE TO RELATED APPLICATIONS AND CLAIM FOR PRIORITY

This application claims priority under 35 U.S.C. § 119(e) from copending provisional applications Ser. No. 60/801,529 filed May 18, 2006, and Ser. No. 60/863,590 filed Oct. 31, 2006.

TECHNICAL FIELD

The current invention is in the field of nuclear medical imaging. Particularly, the invention relates to projection space mapping of time-of-flight (TOF) PET image data.

BACKGROUND

Nuclear medicine is a unique medical specialty wherein radiation is used to acquire images which show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions which emanate from the body and are captured by a scintillation crystal, with which the photons interact to produce flashes of light or "events." Events are detected by an array of photodetectors, such as photomultiplier tubes, and their spatial locations or positions are calculated and stored. In this way, an image of the organ or tissue under study is created from detection of the distribution of the radioisotopes in the body.

One particular nuclear medicine imaging technique is known as Positron Emission Tomography, or PET. PET is used to produce images for diagnosing the biochemistry or physiology of a specific organ, tumor or other metabolically active site. Measurement of the tissue concentration of a positron emitting radionuclide is based on coincidence detection of the two gamma photons arising from positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors, i.e., the gamma photon emissions are detected virtually simultaneously by each detector. When two oppositely disposed gamma photons each strike an oppositely disposed detector to produce a time coincidence event, they also identify a line of response, or LOR, along which the annihilation event has occurred. An example of a PET method and apparatus is described in U.S. Pat. No. 6,858,847, which patent is incorporated herein by reference in its entirety.

After being sorted into parallel projections, the LORs defined by the coincidence events are used to reconstruct a three-dimensional distribution of the positron-emitting radionuclide within the patient. In two-dimensional PET, each 2D transverse section or "slice" of the radionuclide distribution is reconstructed independently of adjacent sections. In fully three-dimensional PET, the data are sorted into sets of LORs, where each set is parallel to a particular detector angle, and therefore represents a two dimensional parallel projection $p(s, \phi)$ of the three dimensional radionuclide distribution within the patient, where s corresponds to the location of the event along the imaging plane perpendicular to the scanner axis and $\phi$ corresponds to the angle of the detector plane with respect to the x axis in (x, y) coordinate space (in other words, $\phi$ corresponds to a particular LOR direction). Coincidence events are integrated or collected for each LOR and stored as a sinogram. In this format, a single fixed point in f(x,y) traces a sinusoid in the sinogram. In each sinogram, there is one row containing the LORs for a particular azimuthal angle $\phi$; each such row corresponds to a one-dimensional parallel projection of the tracer distribution at a different coordinate along the scanner axis.

An event is registered if both crystals detect an annihilation photon within a coincidence time window $\tau$ (e.g., on the order of 4-5 ns), depending on the timing properties of the scintillator and the field of view. A pair of detectors is sensitive only to coincidence events occurring in the volume between the two detectors, thereby eliminating the need for physical collimation, and thus significantly increasing sensitivity. Accurate corrections can be made for the self-absorption of photons within the patient (i.e., attenuation correction) so that accurate measurements of tracer concentration can be made.

The number of time coincidences detected per second within a field of view (FOV) of a detector is the count rate of the detector. The count rate at each of two oppositely disposed detectors, A and B, can be referred to as singles counts, or singles, SA and SB. The time required for a gamma photon to travel from its point of origin to a point of detection is referred to as the time of flight, or TOF, of the gamma photon. TOF is dependent upon the speed of light c and the distance traveled. A time coincidence, or coincidence event, is identified if the time difference between the arrival of signals in a pair of oppositely disposed detectors is within the coincidence time window $\tau$. In conventional PET, the coincidence detection time window $\tau$ is wide enough so that an annihilation event occurring anywhere within the object would produce annihilation gamma photons reaching their respective detectors within the coincidence window. Coincidence time windows of 4.5-12 nsec are common for conventional PET, and are largely determined by the time resolution capabilities of the detectors and electronics.

Time-of-flight (TOF) positron emission tomography (PET) ("TOF-PET") is based on the measurement of the difference $\Delta t$ between the detection times of the two gamma photons arising from the positron annihilation event. This measurement allows the annihilation event to be localized along the LOR with a resolution of about 75-120 mm FWHM, assuming a time resolution of 500-800 ps (picoseconds). Though less accurate than the spatial resolution of the scanner, this approximate localization is effective in reducing the random coincidence rate and in improving both the stability of the reconstruction and the signal-to-noise ratio (SNR), especially when imaging large objects.

Opportunities exist to better optimize projection data for TOF-PET systems.

SUMMARY

Therefore, provided is a TOF-PET data acquisition system. The system includes a PET nuclear imaging device, a processor in communication with the PET nuclear imaging device, one or more RAIDs attached to the processor, and a direct memory access (DMA) rebinner card also attached to the processor.

Further provided is a chip architecture for a Petlink™ direct memory access rebinner (PDR) card. The architecture includes a Router FPGA, two Logic FPGAs in communication with the Router FPGA, and an array of memory chips attached to each Logic FPGA.

Finally, provided is a method of on-line time-of-flight "mashing." The method includes the steps of conducting a nuclear imaging PET scan, outputting the data from the nuclear imaging scan to a processor, acquiring the data from the nuclear imaging scanner using a direct memory access (DMA) rebinner card, and outputting the acquired data.

BRIEF DESCRIPTION OF THE DRAWINGS

Embodiments of the invention will now be described in greater detail in the following by way of example only and with reference to the attached drawings, in which.

DETAILED DESCRIPTION OF EXEMPLARY EMBODIMENTS OF THE INVENTION

As required, disclosures herein provide detailed embodiments of the present invention; however, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ aspects of the present invention.

"Mashing" is a convenient short-hand expression in common use which refers to less precise transaxial angular sampling in the projection data space. TOF mashing enables acquisition of projection data sets that take up less memory space while preserving image resolution.

Figure 1:
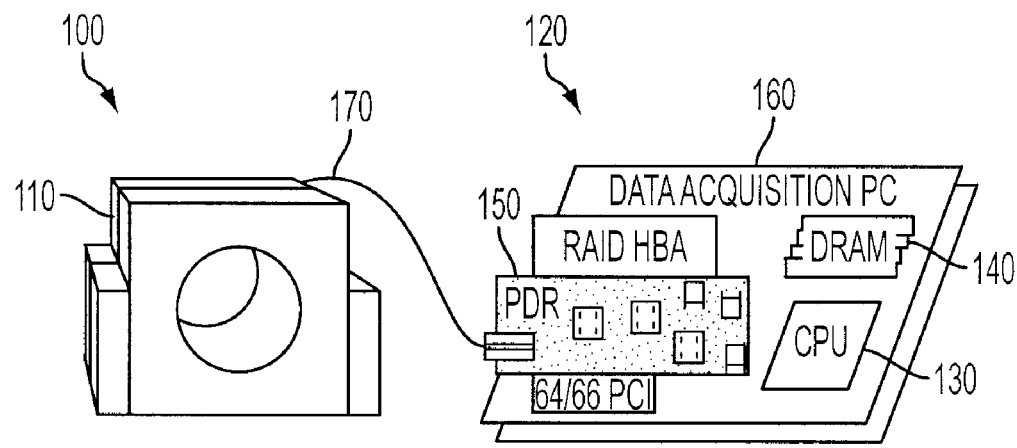
FIG. 1 is system diagram for data acquisition in service to a Long-Axis TOF PET/CT apparatus in accordance with an embodiment of the invention.

FIG. 1 shows a system 100 for data acquisition in service to a Long-Axis TOF PET/CT device. System 100 includes a Long-Axis TOF PET/CT device 110. The PET portion of the device is shown in FIG. 1. TOF PET/CT device 110 may be any suitable TOF-PET device. In one embodiment, TOF PET/CT device 110 may comprise 52 rings of (4×4×20 mm) LSO crystals (624 crystals/ring), a 70 cm diameter field of view (FOV) with a 22 cm axial length, and a 500 ps FWHM TOF resolution.

The primary output of TOF PET/CT device 110 may be a data stream over fiber optic line 170. However, any method of sending data from TOF PET/CT device 110 to a processor may be used. Fiber optic stream 170 may have 64-bit detector pair packets. Each packet may comprise a 6-bit field for TOF encoding.

During data acquisition, each TOF bin (out of 60) may be over sampled at 78 ps. Fiber optic stream 170 may be coupled to a data acquisition processor 120. Processor 120 may contain local Redundant Array of Independent Disks (RAID) 160 and a direct memory access (DMA) rebinner card 150. DMA rebinner card 150 may be a Petlink™ DMA rebinner (PDR) made by Siemens, or DMA rebinner card 150 may be any other card capable of supporting on-line TOF mashing along with TOF-MSRB and nearest-neighbor rebinning into a "linear" projection data space.

The primary output from PDR 150 is a stream of 32-bit bin-address packets. The 30-bit bin-address field in this packet may be directly applied for histogramming into the final "mashed" projection data set. The CPU 130 on processor 120 receives these 32-bit packets and performs on-line histogramming as directed by the 30-bit bin-address content of each packet. CPU 130 may histogram directly into a server-resident DRAM 140. Thereafter, the instantly-completed projection data set may be transferred to local RAID 160. Alternatively, the bin-address packets may be stored directly to RAID 160 (or similar storage medium) in a list-mode data acquisition, for later processing. Processor 120 may have an output device capable of outputting the data so that it may be analyzed or reconstructed into 3-D image data, including but not limited to an internet connection, a printer, a monitor, etc.

Figure 2:
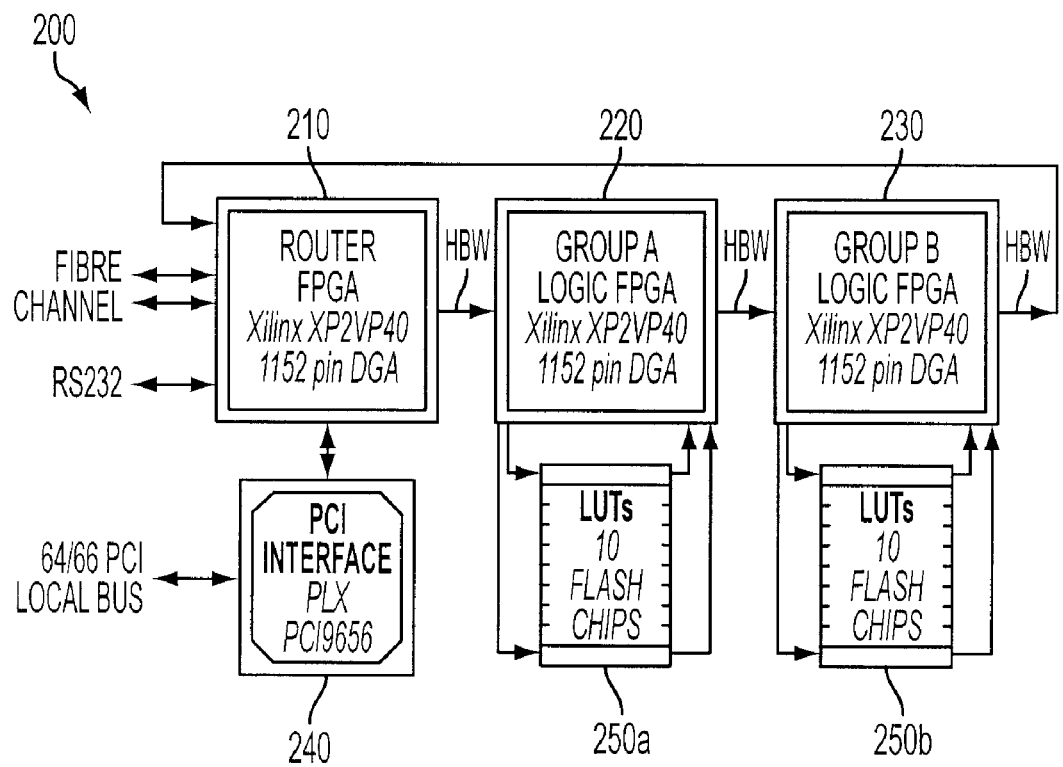
FIG. 2 is a block diagram of a flexible integrated circuit chip architecture in accordance with an embodiment of the invention.

FIG. 2 shows a block diagram and chip architecture for a PDR card 200. 64-bit detector-pair packets may arrive into the Router Field Programmable Gate Array (FPGA) 210 via a fiber optic stream. A digital pipeline may be formed using two Logic FPGAs 220 and 230. Each of Logic FPGAs 220 and 230 may be coupled to an array of 10 8 Mbyte flash memory chips 250(a) and (b). Flash memory chips 250(a) and (b) may be programmed to provide look-up tables (LUT) to service the computations required for mapping from detector-pair space into projection data space. The output of the pipeline may be returned to Router FPGA 210 and then outputted by PCI DMA interface 240 in 32-bit bin-address packet form.

Figure 3:
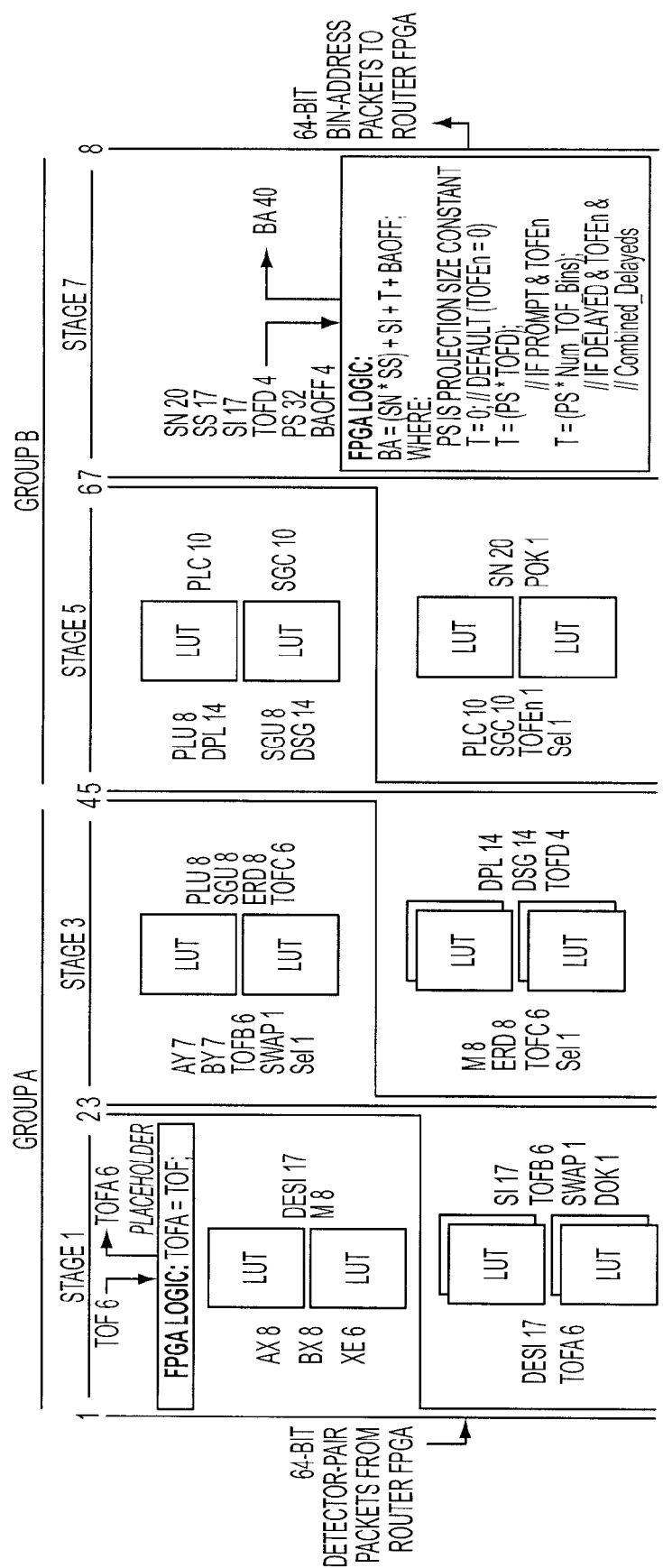
FIG. 3 is a diagram of an embodiment of a PDR digital pipeline as applied to the Long-Axis TOF PET system.

FIG. 3 illustrates one embodiment of the PDR digital pipeline as applied to the Long-Axis TOF PET/CT device. In this embodiment, there is a seven-stage digital pipeline flowing from left to right. 64-bit detector-pair data packets may be inputted to the pipeline. Each heavy black line 1-8 represents digital FPGA latches of at least 64-bit capacity. Each of the blocks labeled LUT represents a 4M×16-bit flash memory chip with input parameter labels on the left (address) and output labels on the right (data). Throughput for the pipeline may be 13 to 15 M sustained packets/second. Stage 1 may generate a preliminary 17-bit "detector encoded" transaxial sinogram index (DESI 17) and an 8-bit "axial correction" parameter (M 8). These Stage 1 outputs result from the transaxial detector pair indexes (AX, BX and XE). Note the "placeholder" for the incoming 6-bit TOF value (TOF 6) means TOFA may be set equal to TOF.

Stage 2 may generate a final transaxial sinogram index (SI 17) from DESI 17 and the incoming 6-bit TOF value (TOFA 6). In addition, a transaxially rebinned TOF value is outputted (TOFB 6). Stage 2 may also generate a SWAP bit for controlling the detector pair orientation—i.e. A×B vs. B×A. It may also generate a single bit indicator for "inside FOV diameter" (DOK1).

Stage 3 may generate an 8-bit uncorrected "plane" (PLU 8) and "segment" (axial angle or SGU 8) indexes with an "encoded ring difference" (ERD 8) value from the axial detector-pair indexes (AY, BY, etc.). The TOF values may pass unmodified though Stage 3 so TOFC=TOSB.

Stage 4 may generate a 14-bit "delta" correction for both the plane (DPL 14) and segment (DSG 14). In addition, Stage 4 may generate a 4-bit TOF value (TOFD 4) which represents TOF values −7 through +7.

Stage 5 may generate corrected-for-true-axial-position plane (PLC 10) and segment (SGC 10) indexes. Stage 6 may calculate the 20-bit sinogram number (SN 20)—i.e. an index into the 3-D array of sinograms. The POK bit maybe be true for LOR not exceeding an oblique angle limit. Stage 7 may calculate the final 40-bit bin-address value (BA 40) using FPGA-resident integer multipliers and adders. A "sinogram-size" constant (SS 18) may be set, for example, to 1118272 (352*84) for the NN 4× case. Similarly, a "projection-size" constant (PS 32) may be set, for example, to 15777216 (336*84*559). A single-bit control for TOF enable (TOFEn) may be provided by Windows™ application software via PCI bus. Similarly, Num_TOF_Bins is a parameter that may be set to 15 for this example. A general purpose FPGA-register-driven bin-address-offset value (BAOFF 40) may be supported. 64-bit bin-address packets may be output to the Router FPGA.

Figures 4A, 4B:
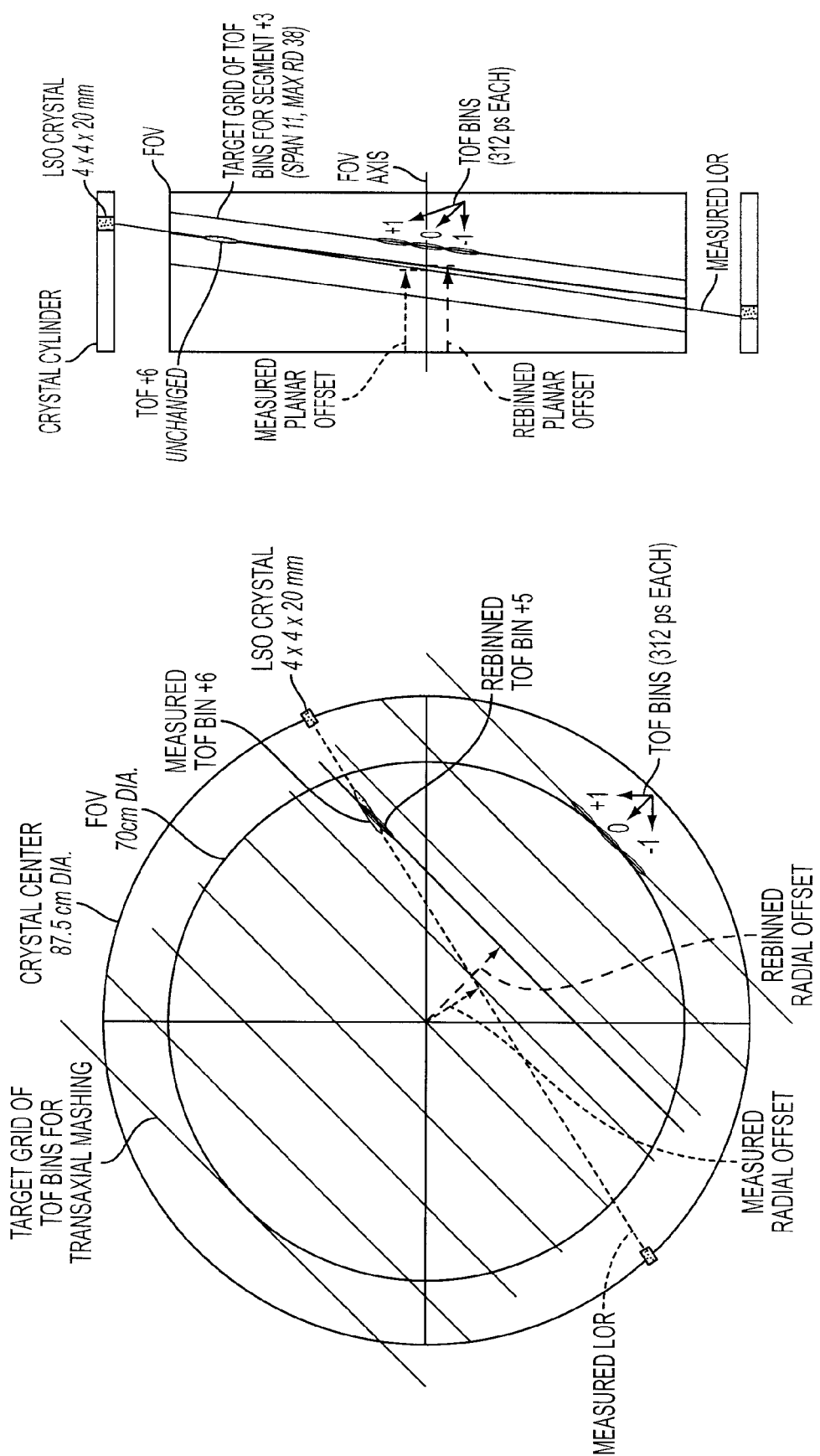
FIGS. 4(a)-(b) are examples of transaxial TOF mashing and TOF axial rebinning.
Figure 5A:
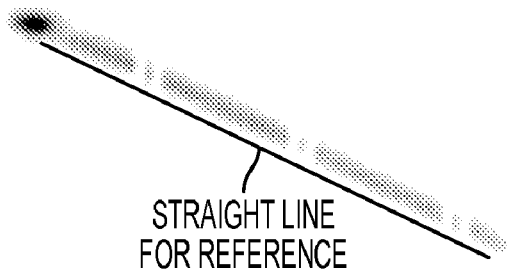
FIG. 5 shows examples of needle source projection data.
Figure 5B:
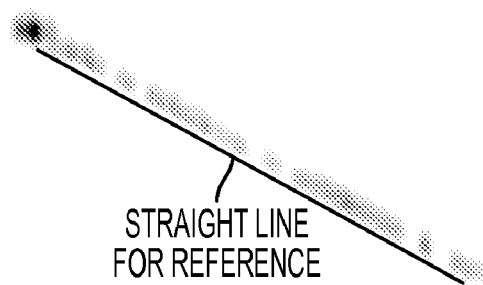
Figure 5C:
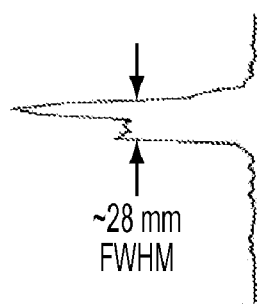
Figure 5D:
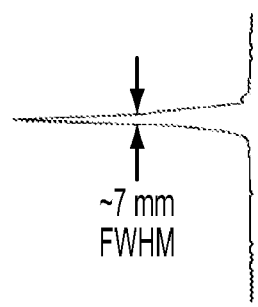
Figure 5E:
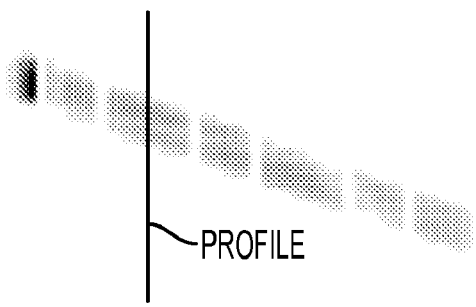
Figure 5F:
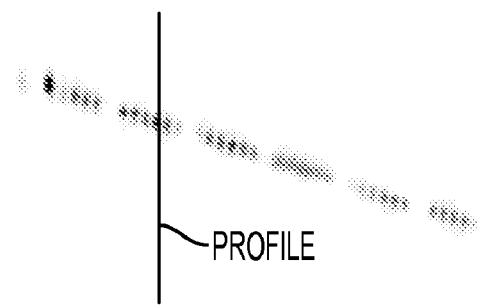

FIGS. 4(a) and 4(b) are diagrams illustrating the mechanisms for both improved transaxial and axial LOR mapping (TOF-MSRB) into the projection space—made possible by the TOF data. FIG. 4(a) shows the change in radial offset that comes with transaxial TOF mashing. It is consistent with a 16× mashing example to help illustrate the mechanism at work. FIG. 4(b) shows the change in axial offset that comes with axial rebinning, i.e. TOF-MSRB or axial rebinning which benefits from the TOF measurement. The image is consistent with a Span 11, Segment+3 example.

FIG. 5 shows example results using a needle source for both nearest-neighbor rebinning and improved axial sampling (TOF-MSRB) due to TOF. The needle source may be $^{68}$Ge, 15 mCi with a length of 18 cm and a diameter of 0.18 cm. The needle source is known to have an unintended, non-uniform source concentration at one end. In each of FIG. 5's projection images (a, b, e, and f) each image represents a 2-D "view" of nearly parallel LOR. Additionally, the images are each oriented on the page as may be consistent with a vertically-aligned FOV axis. The PET-only 64-bit list-mode data acquisition that provides the two projection images a and b lasted for 24,000 seconds. In this acquisition, the needle was placed on a horizontal plane which intersected the FOV axis and the needle was moved to be rather near the edge of the FOV. The PET-only 64-bit list-mode data acquisition which provided the two projection images e and f lasted for 26,000 seconds. In this acquisition, the needle was placed on a horizontal plane which was located approximately 28 cm below the FOV axis. In addition, for e and f, the center of the needle was roughly aligned with a vertical plane intersecting the FOV axis. Note the straighter (less bent) appearance of b versus a. This illustrates the benefits of nearest-neighbor rebinning into a linear projection space. Note the greatly reduced axial blurring of f as compared with e. This somewhat illustrates the benefits of TOF-MSRB. In FIG. 5, c and d are two graphs which roughly compare the axial resolution gain due to TOF axial rebinning (d) over that of LOR mapping (c).

Figure 6:
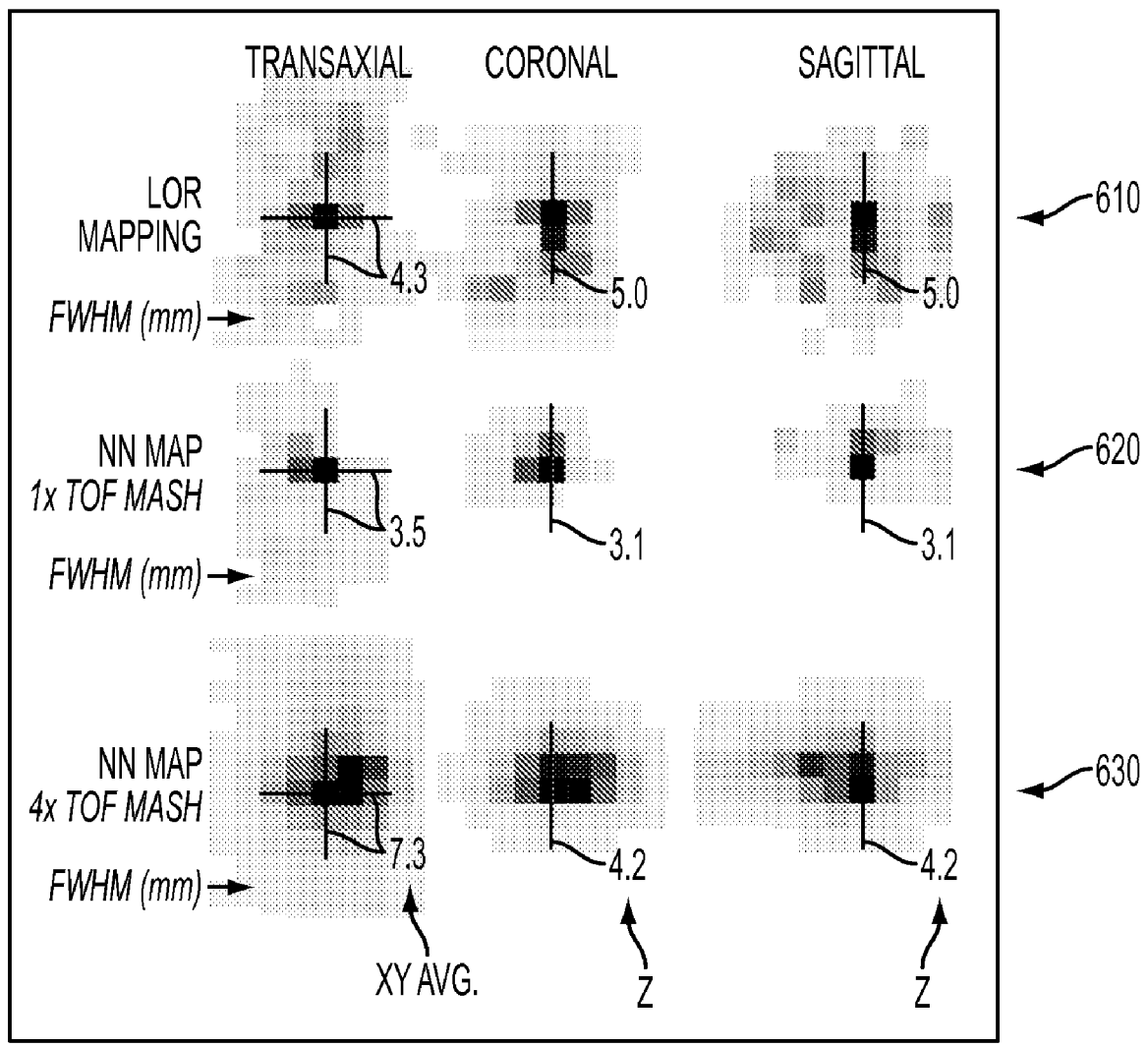
FIG. 6 shows examples of point source images.

FIG. 6 shows an example comparison of 3-D images in 2-D slices as generated from a single PET-only point source acquisition. The point source is $^{68}$Ge, 30 mCis and has a 0.5 mm diameter. The single acquisition was in raw 64-bit detector-pair list-mode form and lasted for 2000 seconds. This single stationary point source was located at plane 50 out of 109 and was held radially out from the FOV axis a distance of approximately 30 cm.

Row 610 shows the results of the more traditional (non-linearly-sampled or native "LOR") LOR-to-projection-bin mapping. This mapping used no nearest-neighbor rebinning, no transaxial TOF mashing, and no axial TOF rebinning (i.e. no TOF-MSRB). Due to no mashing, the transaxial-angle sampling is the normal 336 views across 180 degrees. A total of 15 prompt-only TOF bins were generated with a 16$^{th}$ "TOF" bin containing the combined delays. Each bin represents 312 ps (4.68 cm) of gamma-pair arrival time difference—which is properly sampled for this advanced version of TOF PET. This LOR rebinning was produced by a software utility which—while feasible for implementation within the PDR hardware architecture—is offered as a more derivative function. This projection space was reconstructed using UW-OSEM, 1 iteration, 14 subsets—i.e. no crystal-efficiency normalization and no attenuation correction. Traditional "arc correction" was applied during reconstruction. Note the set of 3 3-D images in row 610 are extracted from the single "LOR" 3-D volume. Note that all 9 2-D images in FIG. 6 are shown with an approximate 9× zoom.

Row 620 of FIG. 6 shows images that result from the nearest-neighbor (NN 1× with TOF-MSRB) based LOR-to-projection-bin mapping. The images result from the application of nearest-neighbor rebinning along with axial repositioning due to TOF (TOF-MSRB)—but no (i.e. 1×) transaxial mashing. The sinograms are each 352 radial samples by 336 angular samples. As is usually implied by NN rebinning, this projection space has linear sampling across all 5 dimensions, i.e. transaxial angle, tangent of axial angle, radial and planar offset, and TOF. This NN rebinning was produced by an exact software emulation of the PDR pipeline as illustrated in FIG. 3. This means that, when FPGA programming is made available, the actual PDR hardware may generate the exact same numerical results as this software rebinning emulation. Also, the PDR hardware may perform this rebinning at a rate of 13 to 15 M events per second internally and up to 7 M events/sec rebinning through its PCI bus interface to PC-based RAID. Because of the linear sampling that comes with the NN algorithm, traditional "arc correction" was not applied by the reconstruction—neither for row 620 or row 630. Here a single 352×352×109 3-D volume was generated using a non-arc-correction version of UW-OSEM with 1 iteration and 14 subsets.

Row 630 of FIG. 6 shows the results of this nearest-neighbor (NN 4× with TOF-MSRB) based LOR-to-projection-bin mapping, a mapping which also includes a preliminary 4× reduction in transaxial-angular sampling via TOF rebinning. Due to the 4× mashing, the transaxial-angle sampling is limited to 84 views across 180 degrees. More similar to row 620 of FIG. 6, the reconstruction algorithm applied here is an UW-OSEM, 1 iteration, 6 subsets with no arc-correction to generate a 352×352×109 3-D volume.

The invention having been thus described, it will be apparent to those skilled in the art that the same may be varied in many ways without departing from the spirit and scope of the invention. Any and all such modifications are intended to be included within the scope of the following claims.

What is claimed is:

1. A system for generating TOF-PET projection data, comprising:
   a direct memory access (DMA) rebinner card coupled to receive a stream of TOF-PET coincidence event data from a TOF-PET nuclear imaging device and to output bin address data associated with said coincidence event data stream; and
   a processor coupled to receive said bin address data and to perform histogramming of said coincidence event data in accordance with said bin address data,
   wherein said data stream comprises a plurality of 64-bit detector pair packets, and wherein each of the 64-bit detector pair packets contains a 6-bit field for TOF encoding.

2. The system of claim 1, wherein the DMA rebinner card is capable of supporting on-line time-of-flight (TOF) mashing along with TOF-MSRB (multiple-slice rebinning) and nearest-neighbor rebinning into a linear projection data space.

3. The system of claim 2, wherein the DMA rebinner card is a Petlink™ DMA rebinner (PDR).

4. The system of claim 1, wherein the DMA rebinner card outputs a stream of 32-bit bin address packets.

5. The system of claim 4, wherein said processor performs on-line histogramming directed by the 32-bit bin address content of each packet.

6. The system of claim 1, further comprising a dynamic random access memory (DRAM) into which said histogrammed data is stored.

7. The system of claim 6, further comprising a RAID to which the DRAM outputs projection data.

8. The system of claim 1, wherein said DMA rebinner card comprises:
a Router FPGA;
two logic FPGAs coupled to the Router FPGA; and
an array of memory chips coupled to each logic FPGA.

9. The system of claim 8, wherein the array of memory chips comprises flash memory chips.

10. The system of claim 9, wherein the array of flash memory chips are 8 Mbyte flash memory chips.

11. The system of claim 9, wherein the flash memory chips are programmed to provide look-up tables (LUT) to service computations required for mapping detector-pair space into projection data space.

12. The system of claim 9, further comprising a pipeline coupling the Router FPGA to the logic FPGAs.

13. The system of claim 12, wherein the output of the pipeline is returned to the Router FPGA and outputted by a PCI DMA in 32-bit bin address packet form.

14. The system of claim 12, further comprising a seven-stage digital pipeline.

15. The system of claim 14, wherein 64-bit detector-pair packets are inputted into the pipeline.

16. The system of claim 15, wherein the first stage generates a preliminary 17-bit detector encoded transaxial sinogram index (DESI) and an 8-bit axial correction parameter.

17. The system of claim 16, wherein the second stage generates a final transaxial sinogram index from DESI and an incoming 6-bit TOF value and outputs a transaxially rebinned TOF value.

18. The system of claim 17, wherein the third stage generates an 8-bit uncorrected plane and segment indexes with an encoded ring difference value from the axial detector-pair indexes.

19. The system of claim 18, wherein the fourth stage generates a 14-bit delta correction for both the plane and segment indexes.

20. The system of claim 19, wherein the fourth stage further generates a 4-bit TOF value which represents TOF values −7 through +7.

21. The system of claim 20, wherein the fifth stage generates plane and segment indexes corrected for true axial position.

22. The system of claim 21, wherein the sixth stage calculates a 20-bit sinogram number.

23. The system of claim 22, wherein the seventh stage calculates a final 40-bit bin address value using FPGA-resident integer multipliers and adders.

24. A method for on-line generation of TOF-PET projection data, comprising:
conducting a TOF-PET imaging scan;
outputting a stream of TOF-PET coincidence event data from said TOF-PET imaging scan to a direct memory access (DMA) rebinner card, which outputs bin address data associated with said coincidence event data stream; and
performing histogramming of said coincidence event data in accordance with said bin address data,
wherein said data stream comprises a plurality of 64-bit detector pair packets, and
wherein each of the 64-bit detector pair packets contains a 6-bit field for TOF encoding.

25. A system for generating TOF-PET projection data, comprising:
a direct memory access (DMA) rebinner card coupled to receive a stream of TOF-PET coincidence event data from a TOF-PET nuclear imaging device and to output bin address data associated with said coincidence event data stream; and
a disk system for storing the bin address data in a list mode acquisition,
wherein said data stream comprises a plurality of 64-bit detector pair packets, and
wherein each of the 64-bit detector pair packets contains a 6-bit field for TOF encoding.

26. The system of claim 25, wherein said disk system is a RAID.

* * * * *